(12) United States Patent
Cooper et al.

(10) Patent No.: US 11,584,310 B2
(45) Date of Patent: Feb. 21, 2023

(54) DRAWER ASSEMBLY FOR MOUNTING TO A CARGO AREA OF A VEHICLE

(71) Applicant: ARB Corporation Limited, Kilsyth (AU)

(72) Inventors: Paul William Cooper, Kilsyth (AU); John Desmond Clark, Kilsyth (AU); Andrew Harry Brown, Kilsyth (AU)

(73) Assignee: ARB Corporation Limited, Kilsyth (AU)

( * ) Notice: Subject to any disclaimer, the term of this patent is extended or adjusted under 35 U.S.C. 154(b) by 15 days.

(21) Appl. No.: 17/082,472

(22) Filed: Oct. 28, 2020

(65) Prior Publication Data

US 2022/0055545 A1 Feb. 24, 2022

(51) Int. Cl.
*B60R 11/06* (2006.01)
*B60R 11/00* (2006.01)
*B60P 3/34* (2006.01)

(52) U.S. Cl.
CPC ............. *B60R 11/06* (2013.01); *B60P 3/34* (2013.01); *B60R 2011/004* (2013.01); *B60R 2011/0082* (2013.01); *B60R 2011/0084* (2013.01); *B60R 2011/0087* (2013.01)

(58) Field of Classification Search
CPC B60P 3/025; B60P 3/0257; B60P 3/34; B60P 3/36; B60R 11/06; B60R 2011/004; B60R 2011/0082; B60R 2011/0084; B60R 2011/0087; B60R 2011/0024; B60R 2011/0043; B60R 5/041; B60R 7/02; B60N 3/16

USPC ..................... 296/37.6, 22, 24.36
See application file for complete search history.

(56) References Cited

U.S. PATENT DOCUMENTS

| | | | | |
|---|---|---|---|---|
| 2,867,471 A * | 1/1959 | Coon, Jr. | .................. | B60P 3/36 126/91 A |
| 2,982,578 A * | 5/1961 | Lowe | .................... | B60P 3/0257 296/22 |
| 3,692,351 A * | 9/1972 | Christopher | ............ | A47J 37/00 126/41 R |
| 4,089,554 A * | 5/1978 | Myers | ...................... | B60N 3/16 296/22 |
| 4,375,306 A * | 3/1983 | Linder | ...................... | B60P 3/32 312/274 |
| 4,518,189 A * | 5/1985 | Belt | ......................... | B60N 3/16 248/416 |
| 4,830,242 A * | 5/1989 | Painter | ...................... | B60P 3/32 224/42.32 |
| 4,969,678 A * | 11/1990 | Loisel | ...................... | B60P 3/38 296/37.16 |
| 5,263,467 A * | 11/1993 | Jones | .................. | A47J 37/0713 126/42 |

(Continued)

*Primary Examiner* — Gregory A Blankenship
(74) *Attorney, Agent, or Firm* — Bookoff McAndrews, PLLC

(57) ABSTRACT

Drawer assembly for mounting to a cargo area of a vehicle. The drawer assembly includes: a drawer body defining a longitudinal axis and configured to be mounted to a track system to allow moving towards and away from the cargo area along the longitudinal axis; and a utility module pivotally mounted to the drawer body about an axis arranged perpendicular to the longitudinal axis. The utility module is pivotable between a storage position, where the utility module is received within the drawer body, and an access position, where the utility module is arranged to extend away from the drawer body.

15 Claims, 7 Drawing Sheets

(56) References Cited

U.S. PATENT DOCUMENTS

| | | | | |
|---|---|---|---|---|
| 5,398,987 | A * | 3/1995 | Sturgis | B60R 9/00 |
| | | | | 224/404 |
| 6,098,346 | A * | 8/2000 | Miller | B60P 3/36 |
| | | | | 296/22 |
| 6,814,383 | B2 * | 11/2004 | Reed, III | B60P 3/14 |
| | | | | 224/404 |
| 8,231,036 | B2 * | 7/2012 | Campbell | B60R 9/065 |
| | | | | 224/42.32 |
| 8,776,778 | B1 * | 7/2014 | Brown | B60R 11/00 |
| | | | | 296/26.05 |
| 8,820,313 | B1 * | 9/2014 | Lutes | B62D 63/062 |
| | | | | 126/41 R |
| 8,925,777 | B1 * | 1/2015 | Casucci | B60R 9/065 |
| | | | | 224/404 |
| 10,967,807 | B1 * | 4/2021 | Hessheimer | B60R 11/0241 |
| 2007/0087725 | A1 * | 4/2007 | Anderson | H04B 1/3816 |
| | | | | 455/348 |
| 2014/0353998 | A1 * | 12/2014 | White | B60P 3/0257 |
| | | | | 296/22 |
| 2018/0170235 | A1 * | 6/2018 | Millis | B60P 3/34 |
| 2019/0232885 | A1 * | 8/2019 | Yamada | B60R 11/0235 |
| 2020/0317111 | A1 * | 10/2020 | Mundt | B60P 3/34 |
| 2020/0361360 | A1 * | 11/2020 | Parker | B60P 3/36 |
| 2022/0055545 | A1 * | 2/2022 | Cooper | B60P 3/34 |

* cited by examiner

DRAWER ASSEMBLY FOR MOUNTING TO A CARGO AREA OF A VEHICLE

CROSS-REFERENCE TO RELATED APPLICATION(S)

This application claims priority to Australian Provisional Patent Application No. 2020903017, filed on Aug. 24, 2020, which is hereby incorporated by reference in its entirety.

TECHNICAL FIELD

The present disclosure relates, generally, to drawer assemblies for mounting to a cargo area of a vehicle and, particularly, for such drawer assemblies including a utility module, such as cooking apparatus.

BACKGROUND

Automotive vehicles are sometimes adapted to have integrated kitchen facilities to allow preparation and cooking of food. These facilities are intended to be used where there is limited or no access to conventional kitchen facilities, for example, when camping in a remote area.

One approach to provide a kitchen facility in a vehicle is to carry the facility in a drawer which is mounted within the vehicle such that the drawer can extend from the rear or side of the vehicle. However, known solutions typically mount the kitchen facility, such as a stove-top and/or sink, in a top surface of the drawer such that only limited or no functional space is also provided to allow preparing food or storing utensils or cookware. Furthermore, many known approaches require a set-up period prior to use which is inconvenient and time consuming.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to some disclosed embodiments, there is provided a drawer assembly for mounting to a cargo area of a vehicle. The drawer assembly includes: a drawer body defining a longitudinal axis and configured to be mounted to a track system to allow moving towards and away from the cargo area along the longitudinal axis; and a utility module pivotally mounted to the drawer body about an axis arranged perpendicular to the longitudinal axis. The utility module is pivotable between a storage position, where the utility module is received within the drawer body, and an access position, where the utility module is arranged to extend away from the drawer body.

The drawer body may define opposed ends spaced along the longitudinal axis. The utility module may be mounted to the drawer body adjacent one of the ends such that, in the access position, the utility module extends perpendicular to the drawer body.

The ends of the drawer body may be configured as an operatively front end and an operatively rear end. The utility module may be mounted to the drawer body adjacent the operatively rear end.

The utility module may configured to support a cooking apparatus.

The utility module may include a stove top.

The drawer body may define a planar upper surface extending continuously between the opposed ends and arranged to be operatively above the utility module.

The drawer assembly may further include an extension portion pivotally connected to an end of the utility module. The extension portion may be pivotable between a stowed position, where the extension portion is arranged against the utility module, and an extended position, where the extension portion is arranged to extend away from the utility module.

The extension portion may define a bench-top.

The bench top may define an aperture dimensioned to receive a container.

The drawer assembly may further include a sink basin mountable in the aperture.

The drawer assembly may further include a second drawer body slidably mounted to the drawer body to allow moving towards and away from the drawer body in a direction perpendicular to the longitudinal axis.

The drawer assembly may further include: a cabinet defining an open end dimensioned to receive the drawer body, the cabinet being configured to be mounted to the cargo area; and a track system slidably mounted to the cabinet and secured to the drawer body to carry the drawer body, the track system operable to carry the drawer body towards and away from the cabinet along the longitudinal axis.

The track system may be arranged to be mounted to an underside of the drawer body The track system may be operable to carry the drawer body between a stowed position, where the drawer body is arranged within the cabinet, and an extended position, where the drawer body is spaced from the cabinet.

The drawer assembly may further include a locking mechanism operable to lock the track system relative to the cabinet when the drawer body is arranged in the extended position.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompanying figures in which.

DESCRIPTION OF EMBODIMENTS

Figure 1:
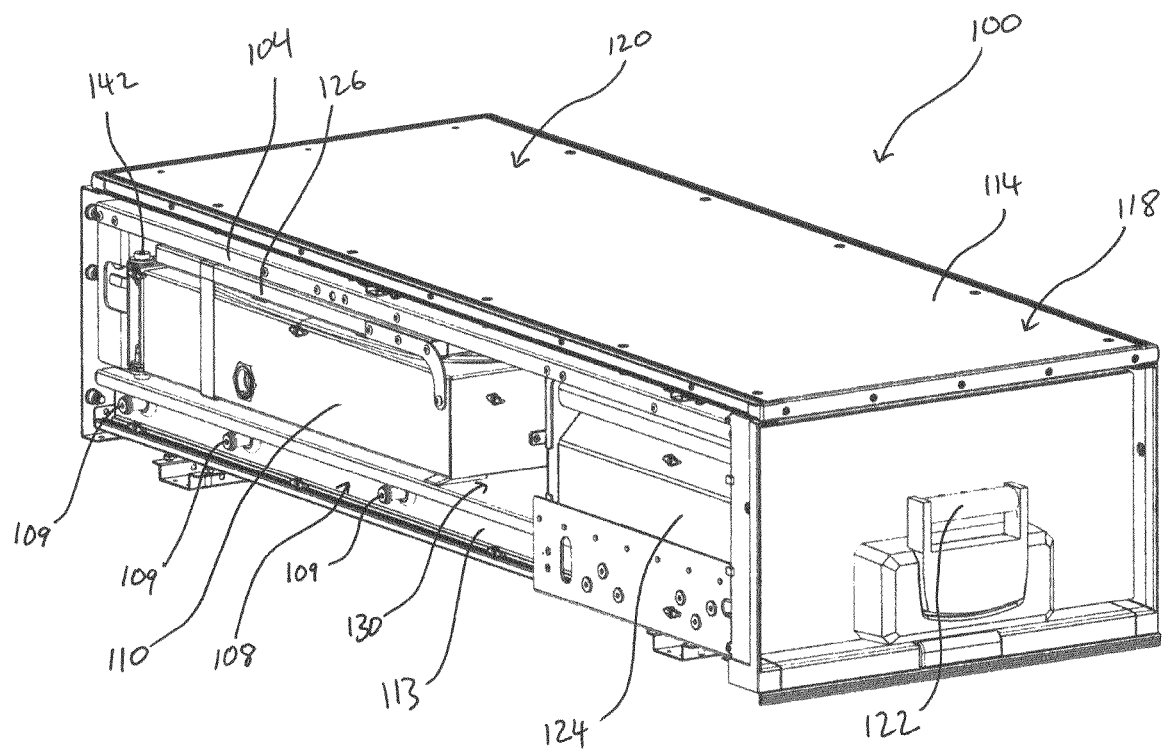
FIG. 1 is a perspective view of a drawer assembly in a first configuration.

In the figures, reference numeral 100 generally designates a drawer assembly 100 for mounting to a cargo area of a vehicle (not illustrated). The drawer assembly 100 includes: a drawer body 104 defining a longitudinal axis 106 (FIG. 2), the drawer body 104 configured to be mounted to a track system 108 to allow moving towards and away from the cargo area along the longitudinal axis 106; and a utility module 110 pivotally mounted to the drawer body 104 about an axis 112 (FIG. 3) arranged perpendicular to the longitudinal axis 106, the utility module 110 being pivotable between a storage position, where the utility module 110 is received within the drawer body 104, and an access position, where the utility module 110 is arranged to extend away from the drawer body 104.

In the illustrated embodiment, the drawer assembly 100 is shown including a cabinet 114 to which the drawer body 104 is slidably mounted via the track system 108. It will be appreciated that the drawer body 104 is configurable as a stand-alone module mountable to other cabinets, racks or housings. For example, the drawer body 104, including the utility module 110, may be configured to be retro-fitted to an existing vehicle-mounted cabinet to allow replacement of another, similarly dimensioned drawer body.

FIG. 1 shows the drawer assembly 100 with the drawer body 104 in a stowed position within a cabinet 114. The drawer body 104 is slidably mounted to the cabinet 114 by the track system 108. The cabinet 114 is configured to be mounted to a vehicle with conventional brackets and/or fasteners. In particular, the cabinet 114 is configured to be mounted within a cargo area of the vehicle, such as the tub of a utility vehicle.

A side wall 116 of the cabinet 114 is shown transparent in FIG. 1 to assist viewing the drawer body 104 and the utility module 110. The drawer body 104 is moveable, via the track system 108, towards and away from the cabinet 114 between the stowed position, where the drawer body 104 is arranged within the cabinet 114, and an extended position (FIG. 2), where the drawer body 104 extends away from the cabinet 114. The cabinet 114 defines an open end 162 which is dimensioned to receive the drawer body 104 and through which the drawer body 104 moves between the two positions.

The track system 108 is slidably mounted to the cabinet 114 and secured to the drawer body 104 to carry the drawer body 104. The track system 108 is operable to carry the drawer body 104 towards and away from the cabinet 114 along the longitudinal axis 106. The track system 108 is arranged to be mounted to an underside of the drawer body 104 and configured such that when the drawer body 104 is arranged in the extended position the drawer body 104 is spaced a defined distance from the cabinet 114. The separation of the drawer 104 and cabinet 114, by the track system 108, is configured to allow spacing the drawer 104 away from the vehicle to which it is mounted to during use. This allows, for example, spacing the drawer 104 away from a tub of a utility vehicle and over a lowered tailgate of the vehicle.

The drawer body 104 defines opposed ends spaced along the longitudinal axis 106 being an operatively front end 118 and an operatively rear end 120. The operatively front end 118 may include a handle 122 configured to allow a user to manually move the drawer body 104 between the stowed position and the extended position.

Figure 7:
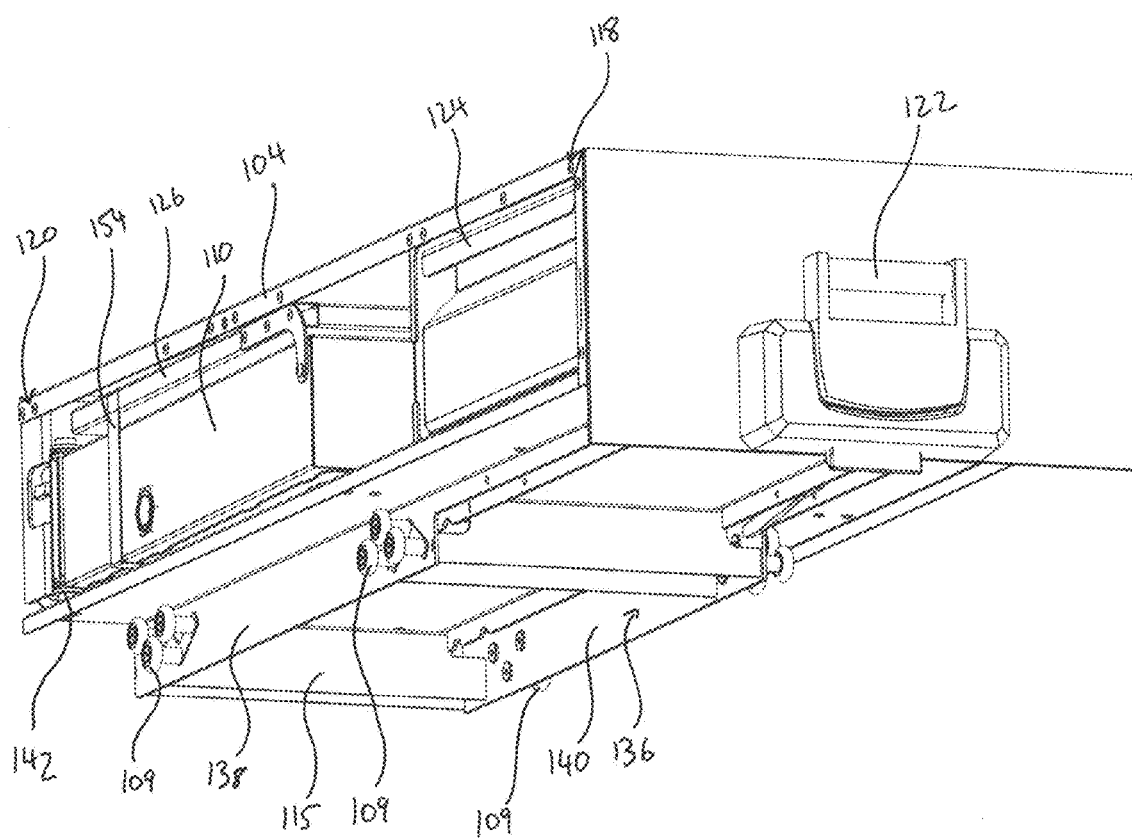
FIG. 7 is a bottom perspective view of the drawer body of FIG. 1, and a drawer support member of the track system.

Best shown in FIGS. 1 and 7, the track system 108 includes a plurality of rotatable rollers 109. A first plurality of the rotatable rollers 109 are mounted to one side wall 116 of the cabinet 114, and a second plurality of the rotatable rollers 109 are mounted to an opposing side wall of the cabinet 114. The track system 108 also includes a pair of elongate track members 113. One of the pair of track members 113 is configured to cooperate with the first plurality of the rotatable rollers 109, and the other of the track members 113 is configured to cooperate with the second plurality of the rotatable rollers 109, to facilitate movement of the drawer body 104 with respect to the cabinet 114.

FIG. 7 illustrates a further component of the track system 108, being a support frame 136 mounted to an underside of the drawer body 104. The support frame 136 includes a first member 138 and a second member 140 arranged to extend from the drawer body 104. A track member support 115 extends between, and supports, the first member 138 and the second member 140. A third plurality of the rotatable rollers 109 are mounted to the first member 138 and a fourth plurality of rotatable rollers 109 are mounted to the second member 140. The rotatable rollers 109 mounted to the support frame 136 cooperate with the track members 113 to facilitate movement of the drawer body 104 with respect to the track members 113. The drawer body 104 is fixedly secured to the support frame 136 so that movement of the drawer body 104 causes corresponding movement of the support frame 136. In some embodiments, the drawer body 104 is integrally formed with the support frame 136. In some embodiments, the support frame 136 includes the handle 122.

Referring again to FIG. 1, the utility module 110 is shown in the storage position to be arranged within an internal volume defined by the drawer body 104. Storing the utility module 110 in this way allows the drawer body 104 to be moved between the extended position and the stowed position unimpeded.

Figure 2:
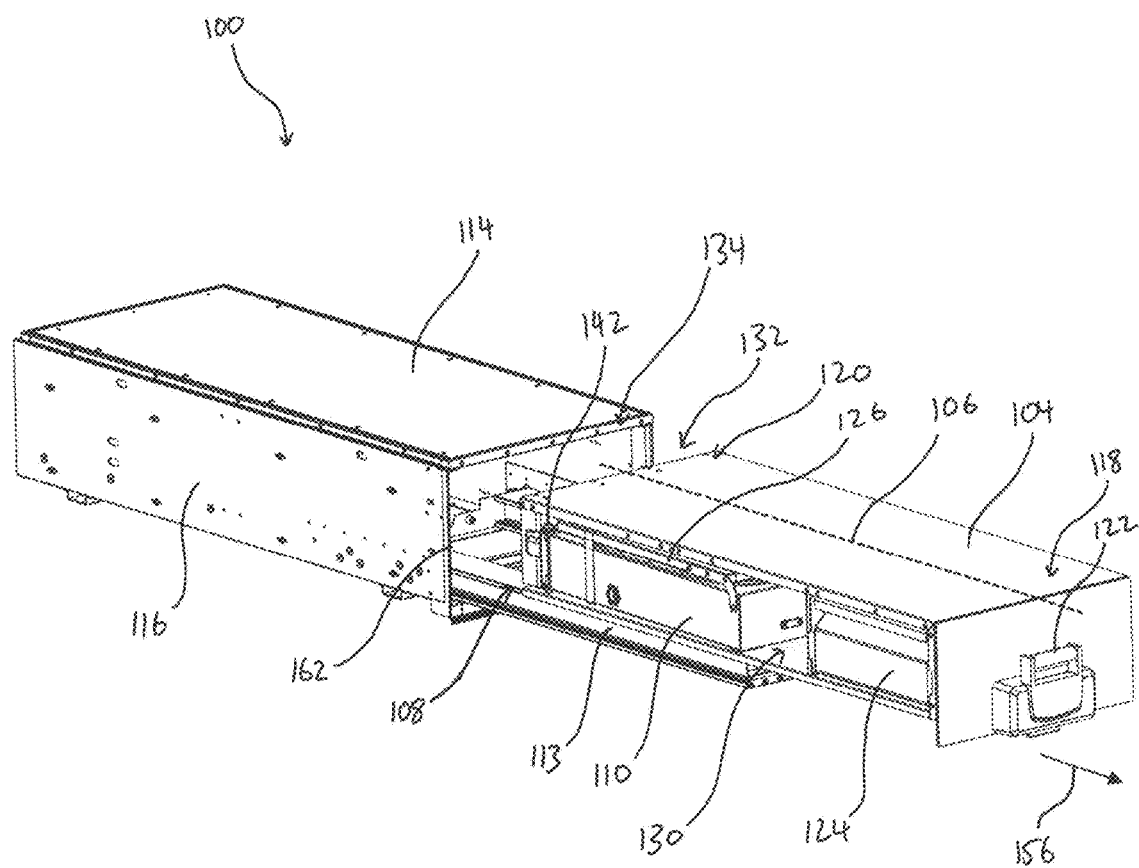
FIG. 2 is a perspective view of the drawer assembly shown in FIG. 1 in a second configuration.

FIG. 2 shows the drawer assembly 100 with the drawer body 104 in the extended position to be spaced from the cabinet 114. The internal volume defined by the drawer body 104, and therefore the utility module 110, is accessible from an open side 130 of the drawer body 104.

The drawer body 104 defines an upper surface 146 to form a utility surface arranged operatively above the utility module 146. In the illustrated embodiment, the upper surface 146 is a continuous, planar surface extending between the opposed ends 118, 120 of the drawer body 146 to form a bench-top. Configuring the upper surface 146 in this way allows a user to use the upper surface 146 to support cookware and prepare food, such as chopping vegetables.

In some embodiments (not illustrated), the upper surface 146 is configured to be discontinuous and/or non-planar. For example, in some embodiments (not illustrated), the upper surface 146 defines an aperture dimensioned to receive a utility component, such as a sink basin, chopping board, utensil drying apparatus, or cooking apparatus. In yet other embodiments (not illustrated), a utility component is integrated with the upper surface 146, such as the upper surface 146 being shaped to define a drying rack.

Figure 3:
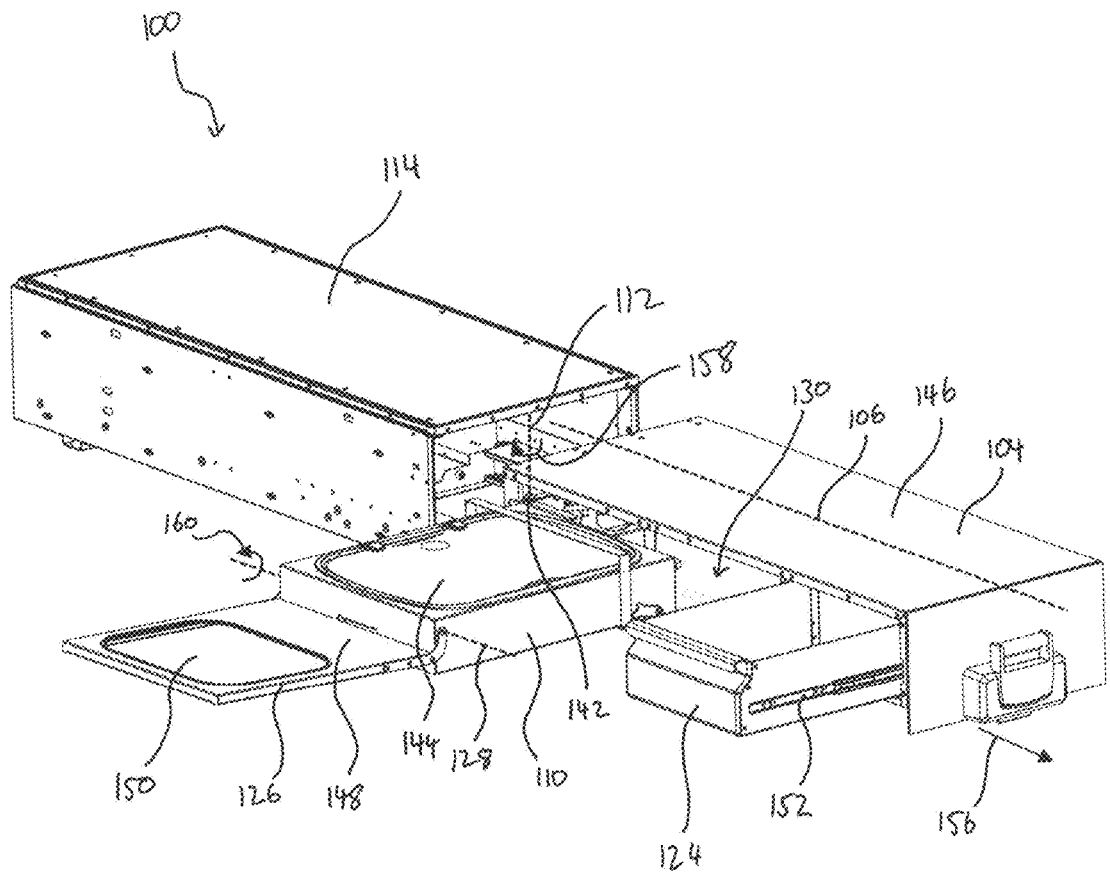
FIG. 3 is a perspective view of the drawer assembly shown in FIGS. 1 and 2 in a third configuration.

The drawer assembly 100 includes a second drawer 124 slidably mounted to the drawer body 104. The second drawer 124 is moveable towards and away from the drawer body 104 in a direction perpendicular to the longitudinal axis 106 when the drawer body 104 is in the extended position, as shown FIG. 2. The second drawer 124 is moveable between an open position, to allow accessing an internal volume defined by the second drawer 124, as shown in FIG. 3, and a closed position as shown in FIG. 2. When in the closed position, the second drawer 124 is contained within the drawer body 104.

Figure 8:
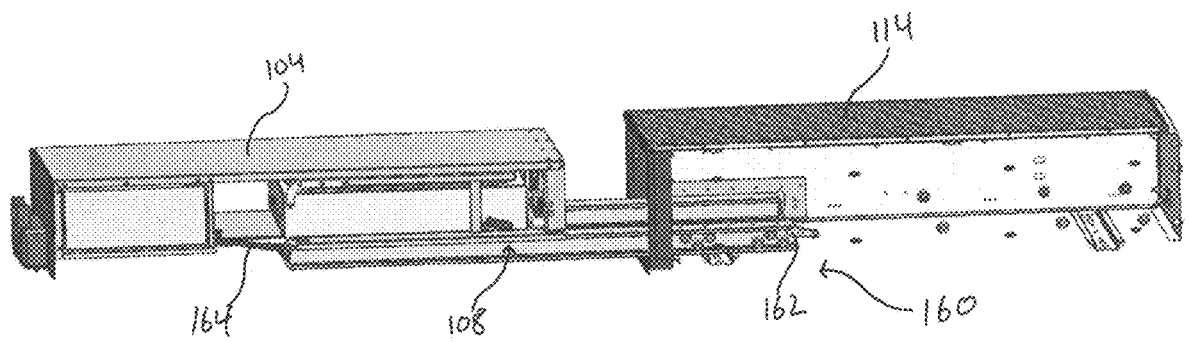
FIGS. 8 to 10 are a side view, and two detailed views, respectively, of a locking mechanism operable to maintain the drawer assembly in the second or third configuration.

The drawer assembly 100 includes a locking mechanism 160 (FIG. 8) operable to lock the drawer body 104 in the extended position by inhibiting movement of the track system 108 relative to the cabinet 114, and inhibiting movement of the support frame 136, and consequently the drawer body 104, relative to the track system 108.

Figure 9:
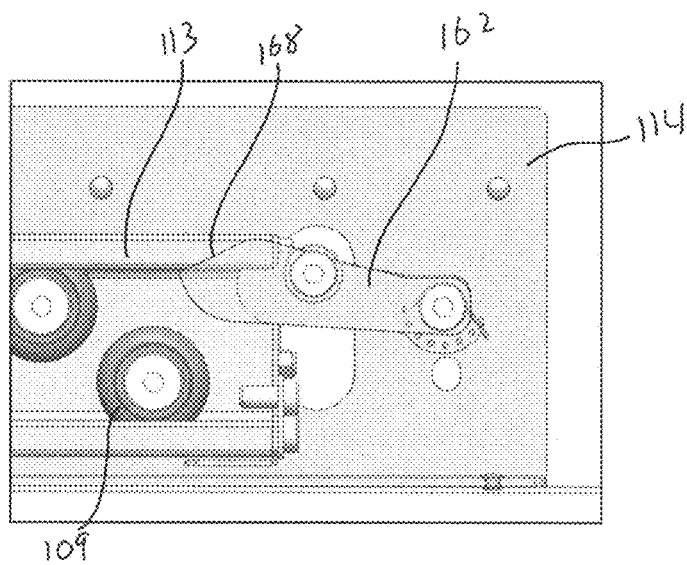
Figure 10:
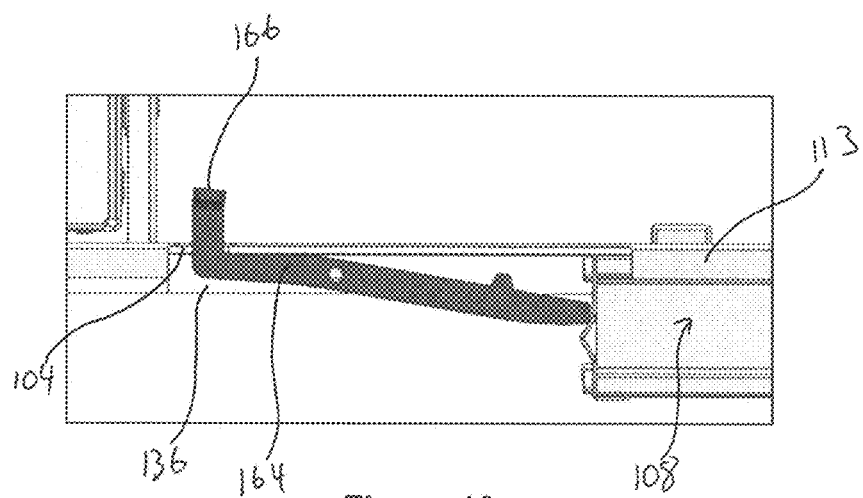

Best shown in FIGS. 9 and 10, the locking mechanism 160 includes two locking members 162, 164. The first locking member 162 is pivotally mounted to a sidewall of the cabinet 114 and arranged to engage a rear end of the track system 108, in the illustrated embodiment being arranged and shaped to engage one of the track members 113, when in the extended position. The first locking member 162 is typically biased by a torsion spring to pivot upwardly to engage the track member 113.

The second locking member 164 is pivotally mounted to the drawer body 104 or the support frame 136 and arranged to engage a front end of the track system 108, typically engaging one of the track members 113, when in the extended position. The second locking member 164 is arranged to pivot due to gravitational force, when the drawer body 104 is spaced sufficiently from the cabinet 114, to cause engaging the track member 113 when the drawer body 104 is at the extended position. In some embodiments (not shown), the second locking member is also biased, such as by a torsion spring, to pivot downwardly to engage the track system 108.

The second locking member 164 includes an actuator tab 166 arranged to allow manual pivoting of the second locking member 164. Operating the tab 166, by a user, causes the second locking member 164 to disengage from the track member 113 and allow the drawer body 104 and support frame 136 to move relative to the track members 113, towards the stowed position.

The first locking member 162 includes an abutment surface 168 arranged such that when the first locking member 162 is engaged with the track member 113, the abutment surface 168 can contact the drawer body 104. The abutment surface 168 is typically configured to be transverse relative to the longitudinal axis 106 when engaged with the track member 113. Moving the drawer body 104 into the cabinet 114 urges a rear end of the drawer body 104 against the abutment surface 168 to cause pivoting of the first locking member 162, consequently disengaging the first locking member 162 from the track system 108. It will be appreciated that configuring the locking mechanism 160 in this way allows automatic locking of both members 162, 164 to the track system 108 when the drawer body 104 is withdrawn from the cabinet 114 to the extended position, and requires manual operation of only the second locking member 164 to cause unlocking of both members 162, 164 and allow moving the drawer body 104 to the stowed position.

Figure 4:
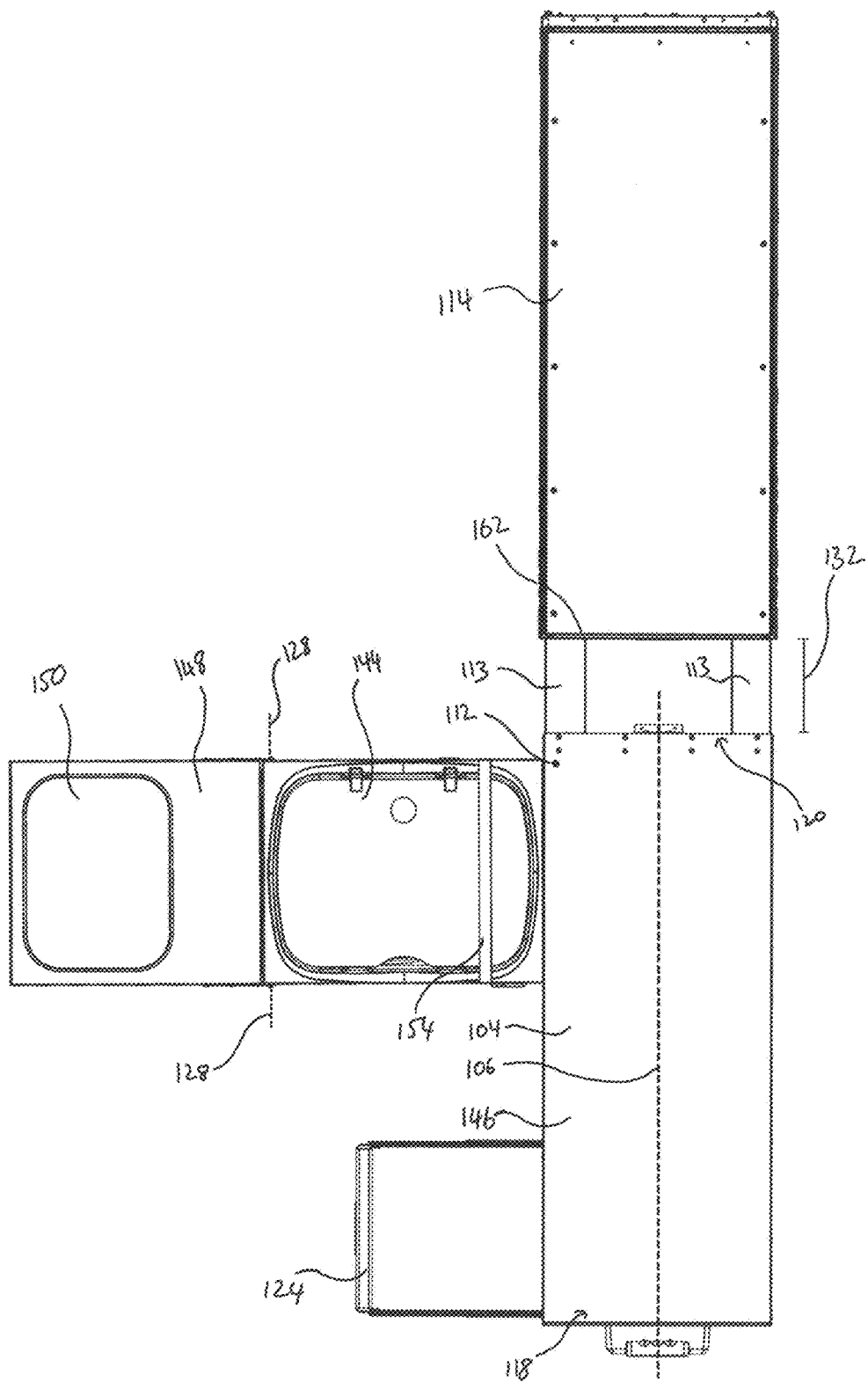
FIG. 4 is a top view of the drawer assembly shown in FIG. 3.

FIGS. 3 and 4 illustrate the utility module 110 pivoted about an axle 142, which defines axis 112, to be arranged in the access position. The axle 142 is secured to each of the drawer body 104 and the utility module 110 to arrange the axis 112 to be perpendicular to the longitudinal axis 106 of the drawer body 104. When in the access position, the utility module 110 extends substantially perpendicularly to the drawer body 104.

In the illustrated embodiment, the axle 142 is secured adjacent the operatively rear end 120 of the drawer body 104 such that the utility module 110 pivots adjacent to this end 120. This means that when the drawer assembly 100 is mounted to the vehicle and arranged as shown in FIG. 3, the utility module 110 is arranged next to the vehicle. This arrangement advantageously avoids a user, using the utility module 110, standing in the limited space between the utility module 110 and the vehicle, which could prove inconvenient.

In the illustrated embodiment, the utility module 110 is configured to support a cooking apparatus 144. In this embodiment, the cooking apparatus 144 is a stove top secured to the utility module 110. In other embodiments (not illustrated), the utility module 110 defines a docking station or is otherwise configured to receive a cooking apparatus, such as a portable barbecue.

In some embodiments (not illustrated), the utility module 110 defines a second utility surface to provide additional bench-top area. In such embodiments, the second utility surface extends between opposed ends of the utility module 110 to allow preparation of food, or supporting cooking apparatus, such as a barbeque.

The utility module 110 is releasably secured to the drawer body 104 to allow removal for use as a stand-alone unit, maintenance, or replacement with an alternatively configured utility module. For example, the kitchen module 110 shown in the figures may be substituted with a toolbox module (not illustrated), or an air compressor module (not illustrated). Similarly, the drawer body 104 is releasably secured to the track system 108 to allow maintenance or replacement with an alternatively configured drawer body (not illustrated), such as a conventional, open-topped drawer body. This may allow rapid reconfiguration of the assembly 100 for different purposes, for example, fitting the drawer body 104 including the utility module 110 for week-end or vacation use, and fitting the open-topped drawer body for week-day use.

In the illustrated embodiment, the utility module 110 is dimensioned to occupy around half of the longitudinal length of the drawer body 104. It will be appreciated that the pivoting relationship of the utility module 110 relative to the drawer body 104 about the axis 112 positioned at, or close to, an end of the drawer body 104 allows the utility module 110 to be dimensioned to be longer, potentially occupying substantially the entire length of the drawer body 104. Such embodiments are useful where the utility module 110 is required to house elongate components, or define a long, continuous bench-top.

An extension portion 126 is pivotally connected to an end of the utility module 110. The extension portion 126 is pivotable about a further axis 128 between a stowed position (FIGS. 1, 2 and 5), where the extension portion 126 is arranged against the utility module 110, and an extended position (FIGS. 3, 6), where the extension portion 126 is arranged to extend away from the utility module 110. In other embodiments (not illustrated), the extension portion 126 is slidably engaged with the utility module 110, for example, along tracks mounted to the module 110, to allow moving towards or away from the module 110.

The extension portion 126 defines a planar upper surface to form an additional bench-top 148. In the illustrated embodiment, the bench-top 148 defines an aperture 150 dimensioned to receive a container (not illustrated). In some embodiments, the drawer assembly 100 also includes a sink basin (not illustrated) mountable in the aperture 150. In other embodiments, the aperture 150 is configured to receive a utility component. For example, the aperture 150 may be configured to receive a chopping board, utensil drying apparatus, or secondary cooking apparatus.

Figure 5:
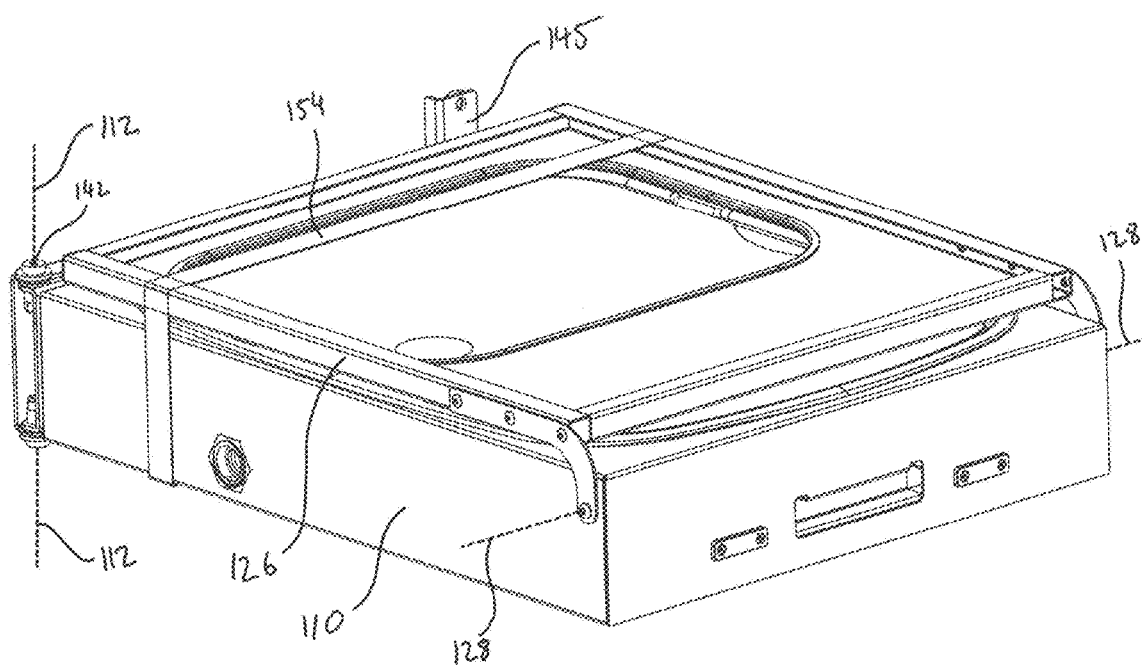
FIG. 5 is a perspective view of the utility module of FIG. 1 where an extension portion is arranged against the utility module in a stowed position.

FIG. 5 shows the utility module 110 in the storage position and the extension portion 126 in the stowed position. When in the stowed position, the extension portion 126 is arranged adjacent to the utility module 110 to be against, or close to, the utility module 110. The utility module 110 includes a retention mechanism, in the illustrated embodiment in the form of a releasably securable strap 154, operable to retain the extension portion 126 in the stowed position.

The utility module 110 includes a stop member 145 extending from one side of the module 110, The stop member 145 is arranged to collide with the drawer body 104 when the utility module 110 is in the access position. This arrangement prevents further pivoting of the utility module 110 away from the drawer body 104 once the utility module 110 has been pivoted to the access position.

Figure 6:
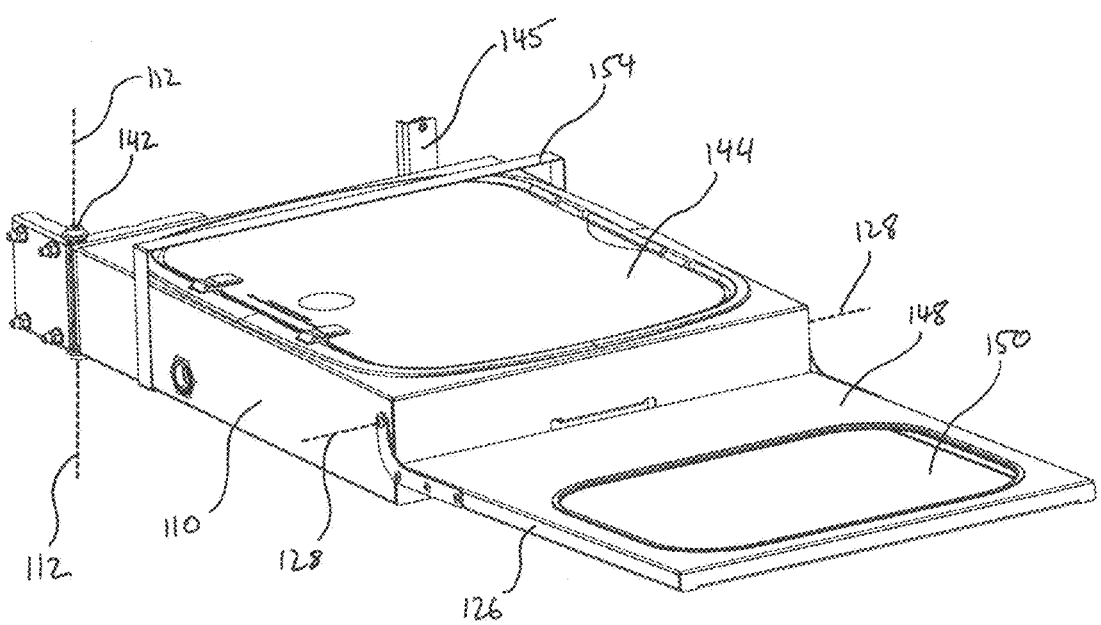
FIG. 6 is a perspective view of the utility module of FIG. 5 where the extension portion is in an extended position to extend away from the utility module.

FIG. 6 shows the utility module 110 in the access position and the extension portion 126 in the extended position. When in the extended position, the extension portion 126 is arranged to extend away from the utility module 110. In some embodiments, the extension portion 126 is biased, such as with a torsion spring, towards the extended position such that when the strap 154 is released, the extension portion 126 is biased to pivot to the extended position to be operatively horizontal.

Use of the drawer assembly 100 initially involves a user manually moving the drawer body 104 to extend from the cabinet 114. This requires the user to apply force to the front end 118 of the drawer body 104, typically to the handle 122, away from the cabinet 114. This causes the drawer body 104 and the support frame 136 to be carried by the rollers 109 mounted to the frame 136 along the track members 113 in a first direction 156. Continued motion causes the support frame 136 to collide with the track member support 115 to transfer force to the track members 113, which are then carried along the rollers 109 mounted to the cabinet 114, until the drawer body 104 is in the extended position. The locking mechanism is then operable to secure the drawer body 104 in position.

When the drawer body 104 is in the extended position, the utility module 110 is pivotable from the storage position to the access position. Depending on the configuration of the second locking mechanism, operation of the mechanism may be necessary to facilitate pivoting of the module 110.

Force applied to the utility module 110 by the user in a second direction 158, away from the drawer body 104, causes the utility module 110 to pivot about the axis 112. Continued motion of the utility module 110 causes the utility module 110 to pivot into the access position where the stop member 145 collides with the drawer body 104 to inhibit further rotation of the utility module 110. Depending on the configuration of the second locking mechanism, operation of the mechanism may allow locking the utility module 110 in the access position.

To return the drawer body 104 to the stowed position, within the cabinet 114, the above steps are repeated in reverse.

The drawer assembly 100 includes the utility module 110 which is pivotable from within the drawer body 104 to extend away from the drawer body 104. This conveniently locates the utility module 110 wholly within the drawer body 104 during storage, limiting dust and moisture ingress, and provides a robust, reliable mechanism operable to allow rapid access to the utility module 110.

When pivoted to the access position, the utility module 110 is arranged perpendicularly to the drawer body 104 to form an L-shaped arrangement. This enhances access to the utility module 110 and the drawer body 104 at the same time. Where the drawer body 104 defines a bench-top surface, such as the upper surface 146 shown in the illustrated embodiments, this usefully provides a significant area of usable space conveniently arranged to perform a wide range of functions, particularly to provide a kitchen facility to allow preparing and cooking food.

The axis 112 about which the utility module 110 pivots is typically arranged adjacent the operatively rear end 120 of the drawer body 104 so that, when in the access position, the utility module 110 extends perpendicularly from the drawer body 104 adjacent the operatively rear end 120. This means that during use, the utility module 110 is located between the user and the vehicle. This can enhance the safety of the drawer apparatus 100 as, for example, this arrangement ensures the user can rapidly distance themselves from the cooking apparatus 114 to avoid a hazard, such as fire or hot oil.

Furthermore, by positioning the axis 112 adjacent the operatively rear end 120 of the drawer body 104, the structural integrity of the drawer assembly 100 may be enhanced. The utility module 110 is connected to the drawer body 104 which, in turn, is supported by the track system 108 and the connection between the track system 108 and the cabinet 114. The track system 108 is therefore a cantilever supporting the drawer body 104 with respect to the cabinet 114. A bending moment caused by the weight of the utility module 110 is applied to the track system 108 and increases as the distance between the utility module and the cabinet 114 increases. By positioning the axis 112 about which the utility module 110 pivots adjacent the rear end 120 of the drawer body 104, the distance between the utility module 110 and the cabinet 114 is minimised, reducing the bending moment on the track system 108 and the connection between the track system 108 and the cabinet 114.

The track system 108 is advantageously configured to arrange the drawer body 104 to be spaced from the cabinet 114, in the extension position, to define a gap 132 therebetween. As described, the drawer assembly 100 is suitable for mounting in a cargo area of a vehicle, and typically is mounted in a utility vehicle, or truck, with an open-topped cargo bay having a tailgate. By spacing apart the operatively rear end 120 of the drawer body 104 from the cabinet 114, with the track system 108, the drawer body 104 is typically arranged to extend beyond the rear of the vehicle and across any tailgate. Accessibility to the drawer body 104 and the utility module 110 is therefore enhanced.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A drawer assembly for mounting to a cargo area of a vehicle, the drawer assembly including:
   a drawer body defining a longitudinal axis and configured to be mounted to a track system to allow moving towards and away from the cargo area along the longitudinal axis; and a utility module pivotally mounted to the drawer body about an axis arranged operatively vertical and perpendicular to the longitudinal axis, the utility module being pivotable between a storage position, where the utility module is received within the drawer body, and an access position, where the utility module is arranged to extend away from a side of the drawer body.

2. The drawer assembly of claim 1, wherein the drawer body defines opposed ends spaced along the longitudinal axis, and the utility module is mounted to the drawer body adjacent one of the ends such that, in the access position, the utility module extends perpendicular to the drawer body.

3. The drawer assembly of claim 2, wherein the ends of the drawer body are configured as an operatively front end and an operatively rear end, and the utility module is mounted to the drawer body adjacent the operatively rear end.

4. The drawer assembly of claim 1, wherein the utility module is configured to support a cooking apparatus.

5. The drawer assembly of claim 4, wherein the utility module includes a stove top.

6. The drawer assembly of claim 5, wherein the drawer body defines a planar upper surface extending continuously between the opposed ends and arranged to be operatively above the utility module.

7. The drawer assembly of claim 1, further including an extension portion pivotally connected to an end of the utility module, the extension portion being pivotable between a stowed position, where the extension portion is arranged against the utility module, and an extended position, where the extension portion is arranged to extend away from the utility module.

8. The drawer assembly of claim 7, wherein the extension portion defines a bench-top.

9. The drawer assembly of claim 8, wherein the bench top defines an aperture dimensioned to receive a container.

10. The drawer assembly of claim 9, further including a sink basin mountable in the aperture.

11. The drawer assembly of claim 1, further including a second drawer body slidably mounted to the drawer body to allow moving towards and away from the drawer body in a direction perpendicular to the longitudinal axis.

12. The drawer assembly of claim 1, further including:
a cabinet defining an open end dimensioned to receive the drawer body, the cabinet being configured to be mounted to the cargo area; and
a track system slidably mounted to the cabinet and secured to the drawer body to carry the drawer body, the track system operable to carry the drawer body towards and away from the cabinet along the longitudinal axis.

13. The drawer assembly of claim 12, wherein the track system is arranged to be mounted to an underside of the drawer body.

14. The drawer assembly of claim 13, wherein the track system is operable to carry the drawer body between a stowed position, where the drawer body is arranged within the cabinet, and an extended position, where the drawer body is spaced from the cabinet.

15. The drawer assembly of claim 14, further including a locking mechanism operable to lock the track system relative to the cabinet when the drawer body is arranged in the extended position.

* * * * *

UNITED STATES PATENT AND TRADEMARK OFFICE
CERTIFICATE OF CORRECTION

| | | |
|---|---|---|
| PATENT NO. | : 11,584,310 B2 | Page 1 of 1 |
| APPLICATION NO. | : 17/082472 | |
| DATED | : February 21, 2023 | |
| INVENTOR(S) | : Paul William Cooper, John Desmond Clark and Andrew Harry Brown | |

It is certified that error appears in the above-identified patent and that said Letters Patent is hereby corrected as shown below:

On the Title Page

Item [30] insert:
--Foreign Application Priority Data
Aug. 24, 2020 (AU)............................2020903017--.

Signed and Sealed this
Second Day of May, 2023

Katherine Kelly Vidal
Director of the United States Patent and Trademark Office